(12) United States Patent
Oguma

(10) Patent No.: US 6,225,244 B1
(45) Date of Patent: *May 1, 2001

(54) GLASS FOR NEAR ABSORPTION FILTER AND NEAR INFRARED ABSORPTION FILTER TO WHICH THE GLASS IS APPLIED

(75) Inventor: Hironori Oguma, Hino (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,478

(22) Filed: Jan. 20, 1999

(30) Foreign Application Priority Data

Jan. 21, 1998 (JP) .................................. 10-009277

(51) Int. Cl.⁷ ..................................... C03C 3/16
(52) U.S. Cl. ............................... 501/45; 501/47; 501/48; 501/73; 501/79; 501/904
(58) Field of Search ................................ 501/45, 46, 48, 501/73, 79, 904

(56) References Cited

U.S. PATENT DOCUMENTS

| | | | | |
|---|---|---|---|---|
| 5,032,315 | * | 7/1991 | Hayden et al. | 501/45 |
| 5,153,151 | * | 10/1992 | Aitken | 501/45 |
| 5,173,212 | * | 12/1992 | Speit et al. | 501/45 |
| 5,173,456 | * | 12/1992 | Hayden et al. | 501/45 |
| 5,668,066 | * | 9/1997 | Oguma et al. | 501/45 |

FOREIGN PATENT DOCUMENTS

| | | |
|---|---|---|
| 62-128943 | 6/1987 | (JP) . |
| 4-104918 | 4/1992 | (JP) . |
| 9-100136 | 4/1997 | (JP) . |

* cited by examiner

Primary Examiner—Karl Group
(74) Attorney, Agent, or Firm—Nixon & Vanderhye

(57) ABSTRACT

A glass for a near infrared absorption filter, which has spectral characteristics that it efficiently transmits light in a wavelength region of from ultraviolet region to 600 nm and selectively absorbs light in a near infrared region of a wavelength of larger than about 600 nm, a near infrared absorption filter formed of the above glass, and a solid-state image sensing device to which the above filter is applied, the glass comprising, by cationic %, 35 to 54% of P, 20 to 47% of Zn, 0 to 8% of the total, R, of Li, Na, K and Cs which are monovalent metal elements, 0 to 17% of the total, M, of Mg, Ca, Ba, Sr and Pb which are divalent metal elements, the total of R and M being 1 to 22%, 0.1 to 7% of As, 0.2 to 9% of Cu and 0 to 6% of Al.

20 Claims, 2 Drawing Sheets

GLASS FOR NEAR ABSORPTION FILTER AND NEAR INFRARED ABSORPTION FILTER TO WHICH THE GLASS IS APPLIED

BACKGROUND OF THE INVENTION

1. Field of the Invention

The present invention relates to a glass for a near infrared absorption filter, a near infrared absorption filter formed of the glass, and a solid-state image sensing device to which the filter is applied. More specifically, it relates to a glass for a near infrared absorption filter, which has spectral characteristics that it efficiently transmits light in a wavelength region of from ultraviolet region to 600 nm and selectively absorbs light in a near infrared region of a wavelength of larger than about 600 nm and which is suitable particularly for use for the color correction of a color VTR camera, a near infrared absorption filter which uses the above glass and is suitable for the above use, a solid-state image sensing device to which the filter is applied.

2. Explanation of Related Technology

As a solid-state image sensing device, conventionally, a color VTR camera mainly uses CCD (charge coupled device) or MOS (metal oxide semi-conductor). Generally, the solid-state image sensing device has a spectral sensitivity to light having a wavelength of approximately from ultraviolet region to 1,000 nm, and the sensitivity extends to a near infrared region, so that it is required to correct the above sensitivity so as to meet the luminous efficacy of human eyes. When natural light comes into the image sensing device, a formed image comes to be reddish and no good color reproduction is attained. In general practice, therefore, light which comes into the image sensing device is corrected with a filter which absorbs light in the near infrared region.

As a glass for use as the above near infrared absorption filter, a variety of glasses obtained by incorporating CuO as a coloring component into a phosphate glass have been developed and are practically used.

For example, there have been disclosed (1) a colored glass containing, by % by weight, 60 to 90% of $P_2O_5$, 7.5 to 20% of $Al_2O_3$, 0 to 15% of a total of $B_2O_3$ and $SiO_2$, 1 to 25% of a total of BaO, MgO, CaO and SrO, 0 to 15% of a total of $Y_2O_3$, $La_2O_3$, $ZrO_2$, $Ta_2O_5$ and $TiO_2$, 0 to 10% of PbO and 0.4 to 15% CuO (JP-A-62-128943), (2) a phosphate glass containing, by % by weight, 60 to 80% of $P_2O_5$, 3 to 11% of $Al_2O_3$, 3 to 9.5% of BaO, 3 to 20% of a total of MgO, CaO, BaO and SrO, 1 to 5.5% of $Li_2O$, 1 to 10% of a total of $LiO_2$, $Na_2O$ and $K_2O$, 0 to 5% of a total of $SiO_2$ and $B_2O_3$, 0 to 5% of $ZrO_2$, $TiO_2$, $Y_2O_3$ and $La_2O_3$ and 0.2 to 10% of CuO (JP-A-4-104918) and (3) a phosphate glass containing, by % by weight, 35 to 50% of $P_2O_5$, 0 to 5% of $Li_2O$, 0 to 12% of $Na_2O$, 0 to 20% of $K_2O$, 0 to 20% of $Cs_2O$, 1.5 to 20% of $R_2O$ (in which R is an alkali metal), 0 to 48% of ZnO, 0 to 7% of MgO, 0 to 7% of CaO, 0 to 7% of SrO, 0 to 12% of BaO, 0 to 15% of R'O (in which R' is an alkaline earth metal) and 0.2 to 12% of CuO (JP-A-9-100136).

Since, however, the above glasses (1) and (2) contain a relatively large amount of $P_2O_5$, a glass component may be eluted when they are used for a long period of time, and it is therefore difficult to use them for a long period of time. Further, when a relatively large amount of $Al_2O_3$ is incorporated for improving climate resistance, the melting temperature thereof increases, and as a result, $Cu^{2+}$ is reduced and $Cu^+$ having an absorption in an ultraviolet region decreases the transmittance to light at and around 400 nm. There is therefore a defect that such a glass is undesirable as a sensitivity correction filter for CCD.

In the above glass (3), the content of $P_2O_5$ is decreased so as to be relatively smaller than that in a conventional phosphate glass, a relatively larger amount of ZnO is incorporated, and an alkaline earth metal oxide and an alkali metal oxide are added as required, whereby the climate resistance and the high transmittance to light in ultraviolet to visible light regions, which cannot be obtained with a conventional phosphate glass, can be obtained.

However, the above glass is not necessarily fully satisfactory although it is relatively fine concerning its alkali resistance.

When a glass has excellent alkali resistance, it is advantageous in that it is free from latent damage even when it is washed with an alkaline detergent highly capable of washing after the glass is polished.

SUMMARY OF THE INVENTION

Under the circumstances, it is a first object of the present invention to provide a glass for a near infrared absorption filter, which is durable in use for a long period of time, has high climate resistance and a high transmittance to light in ultraviolet to visible light regions and has excellent alkali resistance.

It is a second object of the present invention to provide a near infrared absorption filter formed of the above glass, which is suitable for a solid-state image sensing device using a photoelectric conversion element.

It is a third object of the present invention to provide a solid-state image sensing device to which the above infrared absorption filter is applied.

For achieving the above objects, the present inventors have made diligent studies for developing a glass for a near infrared absorption filter, which has the above excellent performances, and as a result it has been found that a specific composition of a phosphate-based near infrared absorption glass containing copper oxide can give a glass (1) which has high chemical durability, (2) which has a high transmittance to light having a wavelength of from ultraviolet region to 600 nm, which transmittance is useful for a near infrared absorption filter, (3) which selectively absorbs light in a wavelength region greater than 600 nm, (4) which is excellent in climate resistance and alkali resistance, and (5) which has a low thermal expansion coefficient (average linear expansion coefficient) as an index for processability. On the basis of the above findings, the present invention has been completed.

That is, (1) according to the present invention, there is provided a glass for a near infrared absorption filter, which comprises, by cationic %, 35 to 54% of P, 20 to 47% of Zn, 0 to 8% of R which represents a total of Li, Na, K and Cs which are monovalent metal elements, 0 to 17% of M which represents a total of Mg, Ca, Ba, Sr and Pb which are divalent metal elements, the total of R and M being 1 to 22%, 0.1 to 7% of As, 0.2 to 9% of Cu and 0 to 6% of Al (the above glass for a near infrared absorption filter will be referred to as "glass I" hereinafter).

(2) According to the present invention, further, there is provided a glass for a near infrared absorption filter, which comprises, by % by weight, 35 to 50% of phosphorus oxide, 25 to 46% of zinc oxide, 0 to less than 1.5% of an oxide I which represents a total of lithium oxide, sodium oxide, potassium oxide and cesium oxide, 0 to 24% of an oxide II which represents a total of magnesium oxide, calcium oxide, barium oxide, strontium oxide and lead oxide, the total of the oxide I and the oxide II being 0.5 to 25%, 0.05 to 5% of arsenic oxide, 0.2 to 5% of copper oxide and 0 to 5% of aluminum oxide, the total amount of the above components being at least 80% based on the total glass components (the above glass for a near infrared absorption filter will be referred to as "glass II" hereinafter).

(3) According to the present invention, further, there is provided a glass for a near infrared absorption filter, which comprises P, Zn, As and Cu as cationic components, and which has a transmittance of at least 80.0% to light having a wavelength of 400 nm at a thickness at which it has a transmittance of 10.0% to light having a wavelength of 700 nm (the above glass for a near infrared absorption filter will be referred to as "glass III" hereinafter).

(4) According to the present invention, further, there is provided a near infrared absorption filter formed of the above glass I, II or III.

(5) According to the present invention, further, there is provided a solid-state image sensing device to which the above near infrared absorption filter is applied.

The term "cationic %" in the present invention means an atomic percentage of a specific atom (which refers to an atom which is converted to a cation when charged, and its valence is not taken into account) based on the total amount of all the atoms which constitute the glass and are converted to cations when charged (their valences are not taken into account).

BRIEF EXPLANATION OF DRAWINGS

In FIG. 1, numeral 1 indicates an optical lens, numerals 2 and 2' indicate optical low-pass filters, numeral 3 indicates a near infrared absorption filter of the present invention, numeral 4 indicates a package, numeral 5 indicates a photoelectric conversion element, and numeral 6 indicates an aperture glass.

PREFERRED EMBODIMENTS OF THE INVENTION

Figure 1:
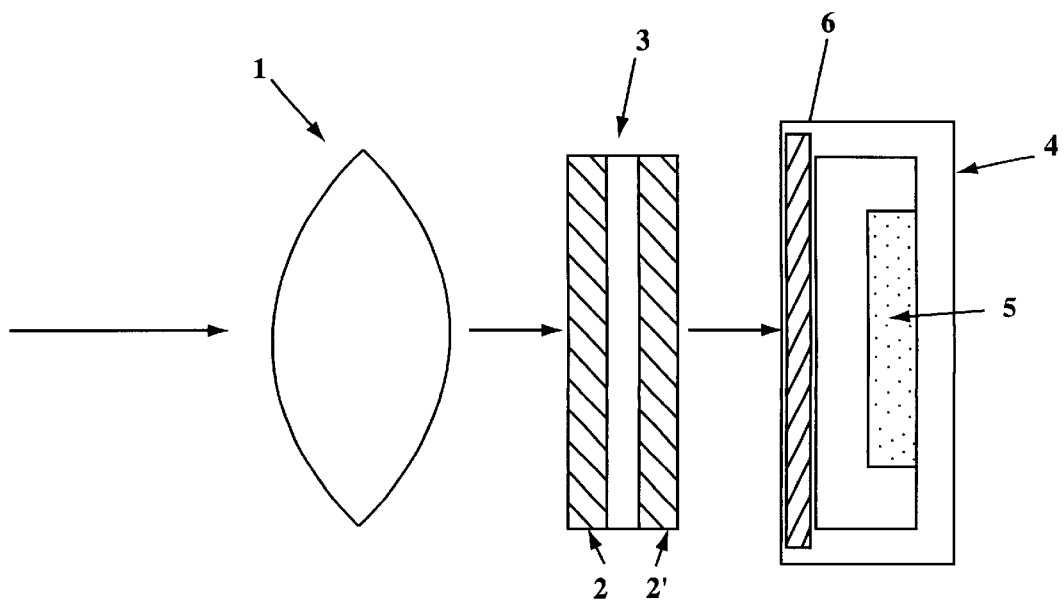
FIG. 1 is a schematic configuration of one example of a solid-state image sensing device to which the filter of the present invention is applied.

The glass I of the present invention will be explained first.

The glass I of the present invention comprises an oxide or a fluoride or both as will be explained later. Phosphorus oxide and phosphorus fluoride as components of the above glass I are the most preferred glass-network-forming components for exhibiting transmittance characteristics that light having a wavelength of from ultraviolet region to 600 nm are transmitted and that light in a wavelength region of 700 nm or greater is selectively absorbed with $Cu^{2+}$. The content of a phosphorus (P) compound (which refers to phosphorus oxide or phosphorus fluoride, and it is to be understood that "compound" of element for constituting the glass means an oxide or fluoride of the element) is required to be in the range of from 35 to 54% of P by cationic %. When the content of the phosphorus compound is less than 35% of P by cationic %, no desired transmittance characteristics can be obtained, and further, the tendency of the glass toward crystallization is intensified, so that it is difficult to stably produce the glass. Further, when the above content exceeds 54%, the chemical durability of the glass extremely decreases, and the intended glass of the present invention can be no longer obtained. In view of the transmittance characteristics, productivity and chemical durability, the content of the phosphorus compound is preferably in the range of from 38 to 52% of P by cationic %.

A zinc (Zn) compound is an essential component for achieving the object of the present invention, and the content thereof is required to be in the range of from 20 to 47% of Zn by cationic %. When the above content is less than 20%, none of excellent chemical durability, climate resistance in particular, meltability and a low thermal expansion coefficient can be attained. When the above content exceeds 47%, the tendency toward crystallization is intensified, which results in difficulties in stable production. In view of chemical durability (climate resistance), meltability, a low thermal expansion coefficient and productivity, the content of the zinc compound is preferably in the range of from 22 to 45% of Zn by cationic %.

All of compounds of Li, Na, K and Cs which are monovalent metal atoms (these metal elements will be generally referred to as "R" hereinafter) are components for improving the meltability of the glass, and the total content thereof is required to be in the range of from 0 to 8% of R by cationic %. When the above content of R exceeds 8%, the glass not only shows decreased alkali resistance but also has an increased thermal expansion coefficient, and the processability thereof in polishing is poor. In view of the meltability and the thermal expansion coefficient of the glass, the contents of the compounds of the above monovalent metal elements (atoms) are preferably in the ranges of from 0 to 8% of Li, from 0 to 4% of Na, from 0 to 3% of K and from 0 to 2% of Cs by cationic %.

All of compounds of Mg, Ca, Ba, Sr and Pb which are divalent metal elements (these metal elements will be generally referred to as "M" hereinafter) are components which improve the climate resistance in a small amount, and the total content thereof is required to be in the range of from 0 to 17% of M by cationic %. When the above content of M exceeds 17%, the climate resistance is reversely decreased, and the glass is poor in diversification resistance. In view of climate resistance and devitrification resistance, the contents of the compounds of the above divalent metal elements (atoms) are preferably 0 to 8% of Mg, 0 to 9% of Ca and 0 to 5% of Sr.

Of the compounds of divalent metal elements, a barium (Ba) compound in particular is a component effective for improving the climate resistance when added in a small amount, and it is therefore preferred to incorporate it. However, the content thereof is too large, the glass has poor devitrification resistance. In view of climate resistance and devitrification resistance, the content of the barium compound is preferably in the range of from 0 to 5% of Ba by cationic %. A lead (Pb) compound is a component for decreasing the melting point of the glass, improving the meltability of the glass and improving the transmittance of the glass by allowing the glass to be melted at a low temperature. When the content thereof exceeds 6% of Pb by cationic %, the devitrification resistance and the climate resistance decrease. The content thereof is therefore preferably in the range of from 0 to 6% of Pb by cationic %.

Further, the total content of the above R and M is required to be in the range of from 1 to 22% by cationic %. When the above content is less than 1%, no excellent climate resistance can be obtained. When it exceeds 22%, it is difficult to carry out stable production. In view of climate resistance and productivity, the total content of R and M is preferably in the range of from 2 to 20% by cationic %.

An arsenic (As) compound is a component which stably maintains coloring with $Cu^{2+}$, and it is the most effective component for improving the transmittance to light having a wavelength of about 400 nm. The content thereof is required to be in the range of from 0.1 to 7% of As by cationic %. The above content is less than 0.1%, the transmittance to light in an ultraviolet region is insufficient. When it exceeds 7%, the climate resistance decreases. In view of the transmittance to light in an ultraviolet region and climate resistance, the content of the arsenic compound is preferably in the range of from 0.1 to 5% of As by cationic %.

A copper (Cu) compound is an essential component for absorbing light in a near infrared region, and the transmittance to light in a near infrared region can be adjusted depending upon the content thereof. The content of the copper compound is required to be in the range of from 0.2 to 9% of Cu by cationic %. When the above content is less than 0.2%, the absorptivity to light in a near infrared region is insufficient. When it exceeds 9%, the tendency toward crystallization is intensified, and it is difficult to carry out stable production. In view of the absorptivity to light in a near infrared region and productivity, the content of the copper compound is preferably in the range of from 0.2 to 7% of Cu by cationic %.

Further, an aluminum (Al) compound is a component for improving the glass in climate resistance and alkali resistance, and the content thereof is required to be in the range of from 0 to 6% of Al by cationic %. When the above content exceeds 6%, the tendency toward crystallization is intensified, and the meltability of the glass decreases. In view of climate resistance, alkali resistance and meltability, the content of the aluminum compound is preferably in the range of from 0.3 to 6% of Al by cationic %.

Further, when aluminum is replaced with scandium (Sc), indium (In) or tantalum (Ta), the weatherbility and the alkali resistance can be maintained.

The glass for a near infrared absorption filter, provided by the present invention, may contain arbitrary components such as compounds of La, Y, Gd, In, Sc, Ge, Nb, Ta, W, Bi, Sn, Sb, Ce, Ga, B, Rb, Si, Ti, Zr, etc., as required.

Of the above arbitrary components, the compounds of La, Y, Ga and Nb are components for improving the glass in chemical durability in a small amount. The contents of these components are preferably in the ranges of from 0 to 1.5% of La, from 0 to 1.5% of Y, from 0 to 2% of Ga and from 0 to 3% of Nb by cationic % of these elements (atoms). When the contents of these components exceed the above ranges by cationic % of the above elements (atoms), the tendency toward crystallization is intensified, and it is difficult to carry out stable production.

Of the above arbitrary components, the compounds of In, Sc, Ge, Gd and Ta in particular are components effective for improving the glass in climate resistance and alkali resistance. The contents of these components are preferably in the ranges of from 0 to 9% of In, from 0 to 6% of Sc, from 0 to 5% of Ge, from 0 to 4% of Gd and from 0 to 4% of Ta by cationic % of these elements (atoms). When the contents of these components exceed the above ranges by cationic % of these elements (atoms), the tendency toward crystallization is intensified, and it is difficult to carry out stable production.

All the compounds of Si, Ti and Zr are components for improving the climate resistance, and the contents of these components are preferably in the ranges of from 0 to 8% of Si, from 0 to 3% of Ti and from 0 to 5% of Zr by cationic % of these elements (atoms). When the contents of these components exceed the above ranges by cationic % of these elements (atoms), not only the melting temperature increases to destabilize the state of $Cu^{2+}$, but also the tendency toward devitrification is intensified, and it is difficult to carry out stable production.

The boron (B) compound is a component which can be incorporated in a relatively large amount as a glass former as a replacement for the phosphorus compound, and the content thereof is preferably in the range of from 0 to 20% of B by cationic %. When the above content exceeds 20%, not only the climate resistance decreases, but also the absorbance of $Cu^{2+}$ to light having a longer wavelength than 600 nm decreases, so that no desirable transmittance characteristics can be obtained.

Both the compounds of Sb and Ce are components effective for maintaining $Cu^{2+}$ in a stable state, and the contents of these components are in the ranges of from 0 to 9% of Sb and from 0 to 1% of Ce by cationic % of these elements (atoms). The content of the antimony (Ab) compound exceeds 9% of Sb by cationic %, the climate resistance decreases. When the content of the cerium (Ce) compound exceeds 1% of Ce by cationic %, not only the climate resistance decreases, but also the absorption of light in an ultraviolet region with $Ce^{4+}$ takes place, so that the transmittance to light at and around 400 nm decreases.

The compounds of W and Bi are components for improving the glass in meltability, and the contents of these components are preferably in the range of from 0 to 4% of W and from 0 to 2% of Bi by cationic % of these elements (atoms). When the contents of these components exceed the above ranges, no desired transmittance characteristics can be obtained, and further, the climate resistance and the alkali resistance decrease.

The tin (Sn) compound is a component for improving the chemical durability of the glass, and the content thereof is preferably in the range of from 0 to 4% of Sn by cationic %. When the above content exceeds 4%, not only the transmittance characteristics are downgraded, but also the tendency to crystallization is intensified.

The rubidium (Rb) compound is a component for improving the meltability of the glass and improving the transitivity. The content thereof is preferably in the range of from 0 to 3% of Rb by cationic %. When the above content exceeds 3%, the devitrification resistance is poor.

The atom which constitutes the glass I of the present invention and forms an anion (its valence is not taken into account) when charged (the above atom will be referred to as "anion component" hereinafter) includes O or F or both since the glass I is formed of an oxide, a fluoride or a both. The contents of these anion components in the glass I are preferably from 60 to 100% of O and from 0 to 40% of F by anionic %. F is a component effective for decreasing the melting temperature and obtaining a stable coloring with $Cu^{2+}$. It can be incorporated without intensifying the tendency toward crystallization. However, when the F content exceeds 40% by anionic %, the thermal expansion coefficient (average linear expansion coefficient) increases, and the problems of cracking, breaking, etc., are liable to occur in processing and polishing the glass. The content of F is more preferably in the range of from 0 to 30% by anionic %, and the content of O is more preferably in the range of from 100 to 70% by anionic %.

The term "anionic %" in the present invention means an atomic percentage of a specific atom based on the total amount of all the anionic components.

The above F can be incorporated by the use of a fluoride material. Although not specially limited, the above fluoride material includes $AlF_3$, LiF, NaF, KF, CsF, $ZnF_2$, $PbF_2$, $CaF_2$, $MgF_2$, $BaF_2$, $ZrF_4$ and $YF_3$.

The glass I having the above composition, provided by the present invention, has excellent transmittance characteristics that it not only exhibits a high transmittance to light in a wavelength region of 400 to 600 nm but also selectively absorbs light in a wavelength region over 600 nm, which are useful for a near infrared absorption filter. Moreover, it has climate resistance sufficient for permitting the use thereof for a long period of time and alkali resistance against latent damage in washing. Further, it has a low thermal expansion coefficient as an index for processability, and the average linear expansion coefficient thereof at 100 to 300° C. is approximately $97 \times 10^{-7}/°$ C. or less.

Further, generally, the glass I generally has a transmittance of at least 80% to light having a wavelength of 400 nm at a thickness at which it has a transmittance of 10.0% to light having a wavelength of 700 nm.

The glass I of the present invention is therefore suitable for a near infrared absorption filter.

The glass II of the present invention will be explained hereinafter.

As described already, the glass II of the present invention contains, by % by weight, 35 to 50% of phosphorus oxide, 25 to 46% of zinc oxide, 0 to less than 1.5% of an oxide I (total of lithium oxide, sodium oxide, potassium oxide and cesium oxide), 0 to 24% of an oxide II (total of magnesium oxide, calcium oxide, barium oxide, strontium oxide and zinc oxide), the total of the oxide I and the oxide II being 0.5 to 25%, 0.05 to 5% of arsenic oxide, 0.2 to 5% of copper oxide and 0 to 5% of aluminum oxide, the total amount of the above components being at least 80% based on the total glass components. When the total amount of the above components based on the total glass components is less than 80%, that is, when the amount of arbitrary component(s) is greater than 20%, it is difficult to obtain a glass which is excellent in climate resistance, alkali resistance and transmittance characteristics and which has a low thermal expansion coefficient.

For the same reason as above, preferred is a glass containing, by % by weight, 37 to 48% of phosphorus oxide, 28 to 40% of zinc oxide, 0 to 0.1% of the oxide I, 0 to 20% of the oxide II, the total of the oxide I and the oxide II being 5 to 23%, 0.1 to 2% of arsenic oxide, 0.5 to 2.5% of copper oxide and 0 to 3% of aluminum oxide, the total amount of the above components being at least 80% based on the total glass components. Preferably, the glass II contains, by % by weight, 0 to 4% of magnesium oxide, 0 to 6% of calcium oxide, 0 to 9% of barium oxide, 0 to 5% of strontium oxide, 0 to 15% of lead oxide, 0 to less than 1.5% of lithium oxide, 0 to less than 1.5% of sodium oxide, 0 to less than 1.5% of potassium oxide and 0 to less than 1.5% of cesium oxide, the total amount of the lithium oxide, the sodium oxide, the potassium oxide and the cesium oxide being 0 to less than 1.5%. Further, the content of the aluminum oxide is preferably in the range of 0.4 to 3% by weight.

Further, the arsenic oxide/copper oxide weight ratio is advantageously at least 0.15. When the above weight ratio is less than 0.15, the transmittance to light having a wavelength of 400 nm at a thickness at which the transmittance to light having a wavelength of 700 nm is 10.0% may come to lower than 80.0%.

The above glass II has been developed for overcoming the problems which the above glass I of the present invention can also overcome. Like the above-explained glass I, therefore, the glass II has excellent transmittance characteristics that it not only exhibits a high transmittance to light in a wavelength region of 400 to 600 nm but also selectively absorbs light in a wavelength region over 600 nm, which are useful for a near infrared absorption filter, and further, the glass II has climate resistance sufficient for permitting the use thereof for a long period of time and alkali resistance against latent damage in washing. Further, it has a low thermal expansion coefficient as an index for process-ability, and the average linear expansion coefficient thereof at 100 to 300° C. is generally 97×10$^{-7}$/° C. or less.

Further, the transmittance to light having a wavelength of 400 nm at a thickness at which the transmittance to light having a wavelength of 700 nm is 10.0% is generally at least 80.0%.

Like the above-explained glass I, the glass II is also suitable for a near infrared absorption filter.

Further, the glass III of the present invention contains P, Zn, As and Cu as cation components and has a transmittance of at least 80.0% to light having a wavelength of 400 nm at a thickness at which it shows a transmittance of 10.0% to light having a wavelength of 700 nm. Like the glasses I and II, the glass III having the above properties is also suitable for a near infrared absorption filter.

Further, according to the present invention, there is provided a near infrared absorption filter formed of the glass I having the above-explained composition, the glass II having the above-explained composition or the glass III having the above-explained properties. The filter is feasible for color correction of incident light in a solid-state image sensing device used, e.g., with a color VTR camera.

According to the present invention, further, there is provided a solid-state image sensing device to which the above near infrared absorption filter is applied.

Although not specially limited, the solid-state image sensing device to which the filter of the present invention is applied is preferably a device using a photoelectric conversion element.

FIG. 1 shows a schematic configuration of one example of the solid-state image sensing device to which the filter of the present invention is applied. In FIG. 1, incident light from a subject passes through an optical lens 1, passes through a unit formed of optical low-pass filters 2 and 2' and the near infrared absorption filter 3 of the present invention and comes into a package 4 having a photoelectric conversion element 5 and an aperture 6 to be converted to electric signals, and the signals are electrically processed.

The glass for a near infrared absorption filter, provided by the present invention, has excellent climate resistance and alkali resistance over conventional phosphate glass, has excellent transmittance characteristics and has a characteristic feature that it has a low thermal expansion coefficient as an index for a yield in processing, and it is remarkably useful as a color correction filter for a color VTR camera or a filter for other light sensing device. It is suitable particularly for a near infrared absorption filter of a solid-state image sensing device of a color VTR camera, and the like.

The present invention will be explained more in detail with reference to Examples hereinafter, while the present invention shall not be limited by these Examples.

EXAMPLES 1–19 AND COMPARATIVE EXAMPLES 1–5

Carbonate, nitrate, hydroxide, oxide, phosphate, etc., were provided as raw materials so as to prepare compositions shown in Tables 1 to 12 (Example 15 further used $ZnF_2$). For example, Example 14 used $H_3PO_4$, $Al(OH)_3$, ZnO, $Na_2O$, $CaCO_3$, $Sr(NO_3)_2$, $Ba(NO_3)_2$, PbO, $In_2O_3$, $GeO_2$, $As_2O_3$ and CuO as raw materials.

First, powders of the above raw materials were fully mixed, and the mixture was melted in a crucible made of platinum at 1,000 to 1,280° C., stirred, defoamed and homogenized. The resultant melt was cast into a pre-heated mold and gradually cooled to obtain a glass block. The so-obtained glass blocks in Examples 1 to 19 had compositions included in the glass I of the present invention, and they also had compositions included in the glass II of the present invention.

Figure 2:
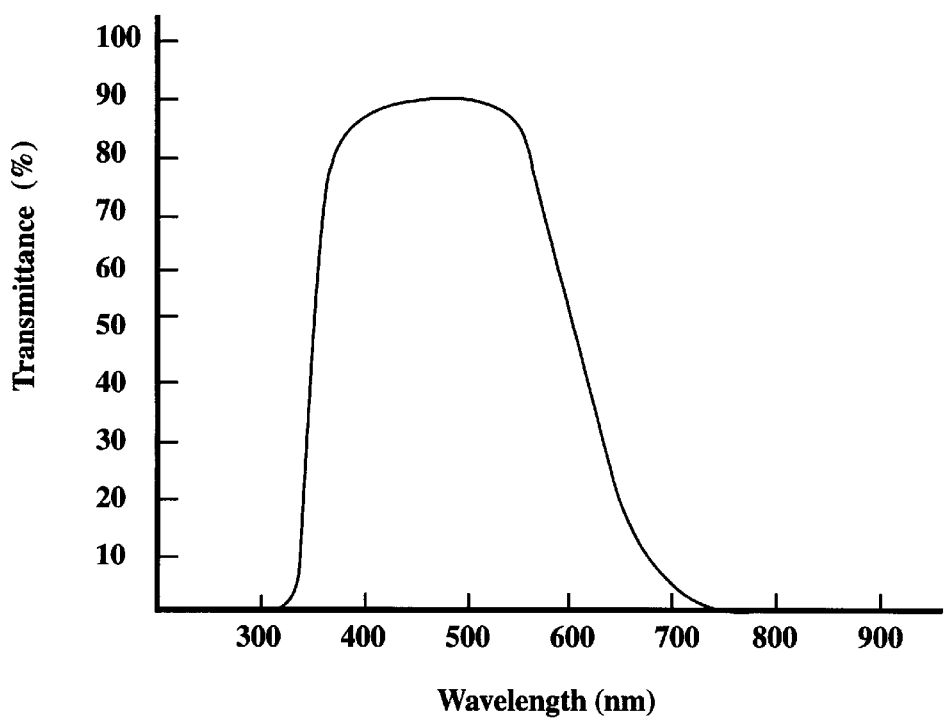
FIG. 2 shows a transmittance curve of a glass obtained in Example 1.

Each of the above-obtained glass blocks was highly accurately polished on both sides until they had a thickness of 1.0 mm, and each glass was measured for a transmittance. FIG. 2 shows the transmittance curve of the glass obtained in Example 1. As is clearly shown in FIG. 2, the glass in Example 1 exhibits a high transmittance to light in a wavelength region of 400 to 520 nm and sharply absorbs light having a wavelength of greater than 650 nm. The glasses in Examples of the present invention had excellent transmittance characteristics for a color correction filter.

The above glasses were also evaluated for climate resistance according to the following method. Tables 2, 4, 6, 8, 10 and 12 show the results.

Climate resistance

As an acceleration test, a glass highly accurately polished on both surfaces was maintained at a relative humidity of 90% RH at 65° C., and a time was measured until a burning was visually observed on the surfaces of the glass, to determine the climate resistance.

Further, the glasses obtained in Examples 1 to 19 and Comparative Examples 3 to 5 were evaluated for average linear expansion coefficients and alkali resistance according to the following methods. Table 13 shows the results.

Average linear expansion coefficient

An average linear expansion coefficient between 100° C. and 300° C. was determined with a thermomechanical analyzer.

Alkali resistance

A 30×30 mm glass sample which was polished on both surfaces until it had a thickness of 1.0 mm was immersed in a 0.01 mol/liter $Na_5P_3O_{10}$ (STPP) aqueous solution at 50° C., which solution was being fully stirred, and then, the glass sample was measured for a loss of mass ($mg/cm^2 \cdot hr$) per a unit area, to determine the alkali resistance.

TABLE 1

| | Example | | | |
|---|---|---|---|---|
| | 1 | 2 | 3 | 4 |
| Glass composition (wt %. cationic %) | | | | |
| $P_2O_5$ (P) | 43.0(46.4) | 48.0(50.0) | 43.0(47.8) | 43.0(49.2) |
| ZnO (Zn) | 37.0(34.8) | 38.0(34.5) | 33.0(32.1) | 37.0(36.9) |
| $ZnF_2$ (Zn) | — | — | — | — |
| $Al_2O_3$ (Al) | 0.4(0.6) | 2.0(2.9) | 1.6(2.5) | 1.0(1.6) |
| $Li_2O$ (Li) | 0.4(2.1) | 1.1(5.5) | — | — |
| $Na_2O$ (Na) | 0.2(0.5) | — | — | — |
| $K_2O$ (K) | 0.6(1.0) | — | 1.1(1.8) | — |
| $Cs_2O$ (Cs) | — | — | 0.3(0.2) | — |
| $R_2O$ (R) | 1.2(3.6) | 1.1(5.5) | 1.4(2.0) | 0.0(0.0) |
| MgO (Mg) | — | — | — | — |
| CaO (Ca) | 3.0(4.1) | — | 4.0(5.6) | 2.1(3.0) |
| SrO (Sr) | 1.0(0.7) | — | 1.0(0.8) | 3.0(2.4) |
| BaO (Ba) | 5.0(2.5) | — | 5.0(2.6) | 5.0(2.7) |
| PbO (Pb) | 4.0(1.4) | — | — | 5.0(1.8) |
| MO (M) | 13.0(8.7) | 0.0(0.0) | 10.0(9.0) | 15.1(9.9) |
| $R_2O$ + MO (R + M) | 14.2(12.3) | 1.5(5.5) | 11.4(11.0) | 15.1(9.9) |
| $As_2O_3$ (As) | 0.3(0.2) | 0.5(0.4) | 0.7(0.6) | 0.4(0.3) |
| CuO (Cu) | 1.1(1.1) | 1.4(1.3) | 1.3(1.3) | 0.5(0.5) |
| $CuO/As_2O_3$ ($Cu^{2+}/As^{3+}$) | 0.27(0.22) | 0.36(0.28) | 0.54(0.43) | 0.80(0.65) |
| $B_2O_3$ (B) | 1.5(3.3) | — | — | — |

Notes: Concerning values of glass compositions, parenthesized values show cationic % (cationic % of atoms or atom groups (element groups; R, M) parenthesized next to components), and the others show wt %.

TABLE 2

| | Example | | | |
|---|---|---|---|---|
| | 1 | 2 | 3 | 4 |
| Glass composition (wt %. cationic %) | | | | |
| $La_2O_3$ (La) | 0.5(0.2) | — | — | — |
| $Y_2O_3$ (Y) | — | — | — | — |
| $Gd_2O_3$ (Gd) | — | — | — | 0.5(0.2) |
| $Bi_2O_3$ (Bi) | — | — | — | — |
| $In_2O_3$ (In) | 2.0(1.1) | 8.0(4.3) | — | 1.0(0.6) |
| $Sc_2O_3$ (Sc) | — | 1.0(1.1) | — | — |
| $Ga_2O_3$ (Ga) | — | — | — | — |
| $GeO_2$ (Ge) | — | — | — | — |
| $SiO_2$ (Si) | — | — | — | — |
| $TiO_2$ (Ti) | — | — | — | 0.5(0.5) |
| $ZrO_2$ (Zr) | — | — | — | — |
| $Nb_2O_5$ (Nb) | — | — | — | — |
| $Ta_2O_5$ (Ta) | — | — | 1.0(0.4) | — |
| $WO_3$ (W) | — | — | — | — |
| $SnO_2$ (Sn) | — | — | — | — |

TABLE 2-continued

| | Example | | | |
|---|---|---|---|---|
| | 1 | 2 | 3 | 4 |
| $Sb_2O_3$ (Sb) | — | — | 8.0(4.3) | — |
| $CeO_2$ (Ce) | — | — | — | 1.0(0.3) |
| Total | 100.0 (100.0) | 100.0 (100.0) | 100.0 (100.0) | 100.0 (100.0) |
| Glass composition (Anionic %) F / O | — (100.0) | — (100.0) | — (100.0) | — (100.0) |
| Climate resistance (time) | 1,040 | 1,025 | 980 | 1,010 |

Notes: Concerning values of glass compositions, parenthesized values show ionic % (cationic % of atoms or atom groups (element groups; R, M) parenthesized next to components), and the others show wt %.

TABLE 3

| | Example | | | |
|---|---|---|---|---|
| | 5 | 6 | 7 | 8 |
| Glass composition (wt %. cationic %) | | | | |
| $P_2O_5$ (P) | 43.0(44.1) | 42.5(46.7) | 45.0(49.2) | 42.5(49.2) |
| ZnO (Zn) | 35.0(31.4) | 30.0(28.8) | 31.0(29.6) | 28.0(28.2) |
| $ZnF_2$ (Zn) | — | — | — | — |
| $Al_2O_3$ (Al) | 1.5(2.2) | 1.5(2.3) | — | 1.0(1.6) |
| $Li_2O$ (Li) | 1.4(6.8) | — | 0.4(2.1) | — |
| $Na_2O$ (Na) | — | 1.0(2.5) | — | — |
| $K_2O$ (K) | — | — | — | 0.4(0.7) |
| $Cs_2O$ (Cs) | — | — | 1.0(0.5) | — |
| $R_2O$ (R) | 1.4(6.8) | 1.0(2.5) | i.4(2.6) | 0.4(0.7) |
| MgO (Mg) | 3.0(5.4) | 0.5(1.0) | — | 1.0(2.0) |
| CaO (Ca) | 3.0(3.9) | 4.5(6.3) | 4.0(5.5) | — |
| SrO (Sr) | — | 2.0(1.5) | 1.0(0.8) | 2.0(1.6) |
| BaO (Ba) | 4.0(1.9) | 8.0(4.1) | 7.0(3.5) | 6.0(3.2) |
| PbO (Pb) | 1.5(0.5) | 4.5(1.6) | — | 9.0(3.3) |
| MO (M) | 11.5(11.7) | 19.5(14.5) | 12.0(9.8) | 18.0(10.1) |
| $R_2O$ + MO (R + M) | 12.9(18.5) | 20.5(17.0) | 13.4(12.4) | 18.4(10.8) |
| $As_2O_3$ (As) | 0.3(0.2) | 1.5(1.2) | 3.8(3.0) | 0.4(0.3) |
| CuO (Cu) | 1.6(1.5) | 4.0(4.0) | 1.8(1.8) | 2.2(2.3) |
| $CuO/As_2O_3$ ($Cu^{2+}/As^{3+}$) | 0.19(0.15) | 0.38(0.30) | 2.11(1.70) | 0.18(0.15) |
| $B_2O_3$ (B) | — | — | — | — |

Notes: Concerning values of glass compositions, parenthesized values show cationic % (cationic % of atoms or atom groups (element groups; R, M) parenthesized next to components), and the others show wt %.

TABLE 4

| | Example | | | |
|---|---|---|---|---|
| | 5 | 6 | 7 | 8 |
| Glass composition (wt %. cationic %) | | | | |
| $La_2O_3$ (La) | 1.0(0.5) | — | — | — |
| $Y_2O_3$ (Y) | — | — | — | — |
| $Gd_2O_3$ (Gd) | — | — | — | — |
| $Bi_2O_3$ (Bi) | 4.0(1.3) | — | — | — |
| $In_2O_3$ (In) | 0.5(0.3) | — | — | — |
| $Sc_2O_3$ (Sc) | — | — | 2.0(2.3) | 1.0(1.2) |
| $Ga_2O_3$ (Ga) | — | — | — | — |
| $GeO_2$ (Ge) | — | — | — | 4.0(4.1) |
| $SiO_2$ (Si) | — | — | — | 0.5(1.3) |
| $TiO_2$ (Ti) | — | — | — | — |
| $ZrO_2$ (Zr) | — | — | — | — |
| $Nb_2O_5$ (Nb) | — | — | — | 1.0(0.6) |
| $Ta_2O_5$ (Ta) | — | — | — | — |
| $WO_3$ (W) | — | — | — | 1.0(0.4) |
| $SnO_2$ (Sn) | — | — | 3.0(1.7) | — |
| $Sb_2O_3$ (Sb) | — | — | — | — |
| $CeO_2$ (Ce) | 0.2(0.0) | — | — | — |

TABLE 4-continued

|  |  | Example | | | |
|---|---|---|---|---|---|
|  |  | 5 | 6 | 7 | 8 |
| Total |  | 100.0 (100.0) | 100.0 (100.0) | 100.0 (100.0) | 100.0 (100.0) |
| Glass composition (Anionic %) | F | — | — | — | — |
|  | O | (100.0) | (100.0) | (100.0) | (100.0) |
| Climate resistance (time) |  | 960 | 1,005 | 970 | 1,015 |

Notes: Concerning values of glass compositions, parenthesized values show ionic % (cationic % of atoms or atom groups (element groups; R, M) parenthesized next to components), and the others show wt %.

TABLE 5

|  | Example | | | |
|---|---|---|---|---|
|  | 9 | 10 | 11 | 12 |
| Glass composition (wt %. cationic %) | | | | |
| $P_2O_5$ (P) | 43.0(47.6) | 46.0(52.3) | 38.0(40.9) | 44.0(48.5) |
| ZnO (Zn) | 45.0(43.4) | 25.5(25.3) | 36.0(33.7) | 37.2(35.7) |
| $ZnF_2$ (Zn) | — | — | — | — |
| $Al_2O_3$ (Al) | 1.5(2.3) | 3.5(5.5) | 2.0(3.0) | 1.0(1.5) |
| $Li_2O$ (Li) | — | — | — | — |
| $Na_2O$ (Na) | — | 0.4(1.0) | — | — |
| $K_2O$ (K) | 1.0(1.7) | 0.2(0.3) | — | — |
| $Cs_2O$ (Cs) | — | — | — | — |
| $R_2O$ (R) | 1.0(1.7) | 0.6(1.3) | 0.0(0.0) | 0.0(0.0) |
| MgO (Mg) | — | — | — | — |
| CaO (Ca) | 0.5(0.7) | 2.0(2.9) | 2.0(2.7) | 5.0(7.0) |
| SrO (Sr) | — | 4.0(3.1) | — | 2.0(1.5) |
| BaO (Ba) | 2.0(1.0) | 3.0(1.6) | 4.0(2.0) | 7.0(3.6) |
| PbO (Pb) | 5.3(1.8) | 10.0(3.6) | 5.0(1.7) | 2.0(0.7) |
| MO (M) | 7.8(3.5) | 19.0(11.2) | 11.0(6.4) | 16.0(12.8) |
| $R_2O$ + MO (R + M) | 8.8(5.2) | 19.6(12.5) | 11.0(6.4) | 16.0(12.8) |
| $As_2O_3$ (As) | 1.0(0.8) | 1.0(0.8) | 2.0(1.5) | 1.4(1.1) |
| CuO (Cu) | 0.7(0.7) | 0.9(0.9) | 1.5(1.4) | 0.4(0.4) |
| $CuO/As_2O_3$ ($Cu^{2+}/As^{3+}$) | 1.43(1.15) | 1.11(0.89) | 1.33(1.07) | 3.50(2.81) |
| $B_2O_3$ (B) | — | — | 4.0(8.8) | — |

Notes: Concerning values of glass compositions, parenthesized values show cationic % (cationic % of atoms or atom groups (element groups; R, M) parenthesized next to components), and the others show wt %.

TABLE 6

|  | Example | | | |
|---|---|---|---|---|
|  | 9 | 10 | 11 | 12 |
| Glass composition (wt %. cationic %) | | | | |
| $La_2O_3$ (La) | — | — | — | — |
| $Y_2O_3$ (Y) | — | — | 1.0(0.7) | — |
| $Gd_2O_3$ (Gd) | — | — | — | — |
| $Bi_2O_3$ (Bi) | — | — | — | — |
| $In_2O_3$ (In) | — | 1.0(0.6) | 2.0(1.1) | — |
| $Sc_2O_3$ (Sc) | — | — | 2.0(2.2) | — |
| $Ga_2O_3$ (Ga) | — | 2.0(1.7) | — | — |
| $GeO_2$ (Ge) | — | — | — | — |
| $SiO_2$ (Si) | — | — | — | — |
| $TiO_2$ (Ti) | — | — | — | — |
| $ZrO_2$ (Zr) | — | 0.5(0.3) | — | — |
| $Nb_2O_5$ (Nb) | — | — | 0.5(0.3) | — |
| $Ta_2O_5$ (Ta) | — | — | — | — |
| $WO_3$ (W) | — | — | — | — |
| $SnO_2$ (Sn) | — | — | — | — |
| $Sb_2O_3$ (Sb) | — | — | — | — |
| $CeO_2$ (Ce) | — | — | — | — |
| Total | 100.0 (100.0) | 100.0 (100.0) | 100.0 (100.0) | 100.0 (100.0) |

TABLE 6-continued

|  |  | Example | | | |
|---|---|---|---|---|---|
|  |  | 9 | 10 | 11 | 12 |
| Glass composition (Anionic %) | F | — | — | — | — |
|  | O | (100.0) | (100.0) | (100.0) | (100.0) |
| Climate resistance (time) |  | 950 | 1,020 | 1,025 | 1,030 |

Notes: Concerning values of glass compositions, parenthesized values show ionic % (cationic % of atoms or atom groups (element groups; R, M) parenthesized next to components), and the others show wt %.

TABLE 7

|  | Example | | | |
|---|---|---|---|---|
|  | 13 | 14 | 15 | 16 |
| Glass composition (wt %. cationic %) | | | | |
| $P_2O_5$ (P) | 40.0(45.9) | 39.0(44.6) | 43.0(51.9) | 44.5(50.8) |
| ZnO (Zn) | 33.7(33.8) | 37.0(36.9) | — | 32.1(32.0) |
| $ZnF_2$ (Zn) | — | — | 35.0(29.0) | — |
| $Al_2O_3$ (Al) | 1.5(2.4) | 1.0(1.6) | 1.0(1.7) | 1.5(2.4) |
| $Li_2O$ (Li) | 0.5(2.7) | — | — | — |
| $Na_2O$ (Na) | — | 1.0(2.6) | — | — |
| $K_2O$ (K) | — | — | 1.4(2.6) | 1.4(2.4) |
| $Cs_2O$ (Cs) | — | — | — | — |
| $R_2O$ (R) | 0.5(2.7) | 1.0(2.6) | 1.4(2.6) | 1.4(2.4) |
| MgO (Mg) | — | — | — | — |
| CaO (Ca) | 3.0(4.4) | 1.0(1.5) | 4.0(6.1) | 2.0(2.9) |
| SrO (Sr) | 1.0(0.8) | 2.0(1.6) | 1.0(0.8) | 1.5(1.2) |
| BaO (Ba) | 5.0(2.7) | 5.5(2.8) | 5.0(2.8) | 6.0(3.2) |
| PbO (Pb) | 8.0(2.9) | 6.0(2.2) | 6.0(2.3) | 9.0(3.3) |
| MO (M) | 17.0(10.8) | 14.5(8.1) | 16.0(12.0) | 18.5(10.6) |
| $R_2O$ + MO (R + M) | 17.5(13.5) | 15.5(10.7) | 17.4(14.6) | 19.9(13.0) |
| $As_2O_3$ (As) | 0.3(0.3) | 0.3 (0.3) | 0.6(0.5) | 0.8(0.7) |
| CuO (Cu) | 1.0(1.0) | 1.0(1.0) | 1.0(1.1) | 1.2(1.2) |
| $CuO/As_2O_3$ ($Cu^{2+}/As^{3+}$) | 0.30(0.24) | 0.30(0.24) | 0.60(0.84) | 0.67(0.54) |
| $B_2O_3$ (B) | — | — | — | — |

Notes: Concerning values of glass compositions, parenthesized values show cationic % (cationic % of atoms or atom groups (element groups; R, M) parenthesized next to components), and the others show wt %.

TABLE 8

|  | Example | | | |
|---|---|---|---|---|
|  | 13 | 14 | 15 | 16 |
| Glass composition (wt %. cationic %) | | | | |
| $La_2O_3$ (La) | — | — | — | — |
| $Y_2O_3$ (Y) | — | — | — | — |
| $Gd_2O_3$ (Gd) | — | — | — | — |
| $Bi_2O_3$ (Bi) | — | — | — | — |
| $In_2O_3$ (In) | 4.0(2.4) | 3.0(1.8) | 2.0(1.2) | — |
| $ScO_2$ (Sc) | — | — | — | — |
| $Ga_2O_3$ (Ga) | — | — | — | — |
| $GeO_2$ (Ge) | — | 3.0(3.0) | — | — |
| $SiO_2$ (Si) | — | — | — | — |
| $TiO_2$ (Ti) | — | — | — | — |
| $ZrO_2$ (Zr) | — | — | — | — |
| $Nb_2O_5$ (Nb) | — | — | — | — |
| $Ta_2O_5$ (Ta) | 2.0(0.7) | — | — | — |
| $WO_3$ (W) | — | — | — | — |
| $SnO_2$ (Sn) | — | — | — | — |
| $Sb_2O_3$ (Sb) | — | — | — | — |
| $CeO_2$ (Ce) | — | 0.2(0.1) | — | — |
| Total | 100.0 (100.0) | 100.0 (100.0) | 100.0 (100.0) | 100.0 (100.0) |

TABLE 8-continued

|  |  | Example | | | |
| --- | --- | --- | --- | --- | --- |
|  |  | 13 | 14 | 15 | 16 |
| Glass composition | F | — | — | (28.0) | — |
| (Anionic %) | O | (100.0) | (100.0) | (72.0) | (100.0) |
| Climate resistance (time) | | 1,050 | 1,080 | 1,070 | 1,045 |

Notes: Concerning values of glass compositions, parenthesized values show ionic % (cationic % of atoms or atom groups (element groups; R, M) parenthesized next to components), and the others show wt %.

TABLE 9

|  | Example | | | Comparative Example |
| --- | --- | --- | --- | --- |
|  | 17 | 18 | 19 | 1 |
| Glass composition (wt %. cationic %) | | | | |
| $P_2O_5$ (P) | 40.0(47.7) | 41.0(47.2) | 35.0(38.6) | 75.5(67.4) |
| ZnO (Zn) | 36.0(37.4) | 40.0(40.2) | — | 1.5(1.2) |
| $ZnF_2$ (Zn) | — | — | 42.0(40.0) | — |
| $Al_2O_3$ (Al) | 1.0(1.7) | 1.0(1.6) | 2.0(3.1) | 14.5(18.0) |
| $Li_2O$ (Li) | — | — | — | — |
| $Na_2O$ (Na) | — | — | — | — |
| $K_2O$ (K) | 0.2(0.4) | — | 1.0(1.7) | — |
| $Cs_2O$ (Cs) | — | — | — | — |
| $R_2O$ (R) | 0.2(0.4) | — | 1.0(1.7) | — |
| MgO (Mg) | — | — | — | 3.0(4.7) |
| CaO (Ca) | 2.0(3.0) | 2.0(2.9) | 6.0(8.4) | — |
| SrO (Sr) | 1.0(0.8) | 1.0(0.8) | 3.0(2.3) | — |
| BaO (Ba) | 4.5(2.5) | 5.5(2.9) | 4.0(2.0) | — |
| PbO (Pb) | 14.0(5.3) | 8.0(2.9) | 5.0(1.8) | — |
| MO (M) | 21.5(11.6) | 16.5(9.5) | 18.0(14.5) | 3.0(4.7) |
| $R_2O + MO$ (R + M) | 21.7(12.0) | 16.5(9.5) | 19.0(16.2) | 3.0(4.7) |
| $As_2O_3$ (As) | 0.5(0.4) | 0.5(0.4) | 0.5(0.4) | — |
| CuO (Cu) | 0.8(0.9) | 1.0(1.0) | 1.5(1.5) | 1.5(1.2) |
| $CuO/As_2O_3$ ($Cu^{2+}/As^{3+}$) | 0.63(0.50) | 0.50(0.40) | 0.33(0.27) | — |
| $B_2O_3$ (B) | — | — | — | 3.0(5.5) |

Notes: Concerning values of glass compositions, parenthesized values show cationic % (cationic % of atoms or atom groups (element groups; R, M) parenthesized next to components), and the others show wt %.

TABLE 10

|  | Example | | | Comparative Example |
| --- | --- | --- | --- | --- |
|  | 17 | 18 | 19 | 1 |
| Glass composition (wt %. cationic %) | | | | |
| $La_2O_3$ (La) | — | — | — | — |
| $Y_2O_3$ (Y) | — | — | — | — |
| $Gd_2O_3$ (Gd) | — | — | — | — |
| $Bi_2O_3$ (Bi) | — | — | — | — |
| $In_2O_3$ (In) | — | — | — | — |
| $Sc_2O_3$ (Sc) | — | — | — | — |
| $Ga_2O_3$ (Ga) | — | — | — | — |
| $GeO_2$ (Ge) | — | — | — | — |
| $SiO_2$ (Si) | — | — | — | 1.0(2.0) |
| $TiO_2$ (Ti) | — | — | — | — |
| $ZrO_2$ (Zr) | — | — | — | — |
| $Nb_2O_5$ (Nb) | — | — | — | — |
| $Ta_2O_5$ (Ta) | — | — | — | — |
| $WO_3$ (W) | — | — | — | — |
| $SnO_2$ (Sn) | — | — | — | — |
| $Sb_2O_3$ (Sb) | — | — | — | — |
| $CeO_2$ (Ce) | — | — | — | — |
| Total | 100.0 (100.0) | 100.0 (100.0) | 100.0 (100.0) | 100.0 (100.0) |

TABLE 10-continued

|  |  | Example | | | Comparative Example |
| --- | --- | --- | --- | --- | --- |
|  |  | 17 | 18 | 19 | 1 |
| Glass composition | F | — | — | — | — |
| (Anionic %) | O | (100.0) | (100.0) | (100.0) | (100.0) |
| Climate resistance (time) | | 1,010 | 1,025 | 980 | 255 |

Notes: Concerning values of glass compositions, parenthesized values show ionic % (cationic % of atoms or atom groups (element groups; R, M) parenthesized next to components), and the others show wt %.

TABLE 11

|  | Comparative Example | | | |
| --- | --- | --- | --- | --- |
|  | 2 | 3 | 4 | 5 |
| Glass composition (wt %. cationic %) | | | | |
| $P_2O_5$ (F) | 78.5(71.2) | 55.0(55.9) | 45.0(46.3) | 44.0(42.5) |
| ZnO (Zn) | — | 31.5(27.9) | 36.0(32.3) | 29.0(24.5) |
| $ZnF_2$ (Zn) | — | — | — | — |
| $Al_2O_3$ (Al) | 10.5(13.3) | 1.0(1.4) | 2.0(2.9) | 1.0(1.4) |
| $Li_2O$ (Li) | 1.5(6.5) | 1.3(6.3) | — | — |
| $Na_2O$ (Na) | — | — | — | — |
| $K_2O$ (K) | — | — | 7.0(10.8) | 17.0(24.8) |
| $Cs_2O$ (Cs) | — | — | — | — |
| $R_2O$ (R) | 1.5(6.5) | 1.3(6.3) | 7.0(10.8) | 17.0(24.8) |
| MgO (Mg) | 3.0(4.7) | — | — | — |
| CaO (Ca) | 1.0(1.2) | 2.0(2.6) | 2.0(2.6) | 2.0(2.5) |
| SrO (Sr) | — | 3.0(2.1) | 1.0(0.7) | 2.0(1.3) |
| BaO (Ba) | 3.5(1.5) | 4.0(1.9) | 4.0(1.9) | 3.0(1.3) |
| PbO (Pb) | — | — | — | — |
| MO (M) | 7.5(7.4) | 9.0(6.6) | 7.0(5.2) | 7.0(5.1) |
| $R_2O + MO$ (R + M) | 9.0(13.9) | 10.3(12.9) | 14.0(16.0) | 24.0(29.9) |
| $As_2O_3$ (As) | — | 0.7(0.5) | 1.0(0.7) | — |
| CuO (Cu) | 2.0(1.6) | 1.5(1.4) | 2.0(1.8) | 2.0(1.7) |
| $CuO/As_2O_3$ ($Cu^{2+}/As^{3+}$) | — | 0.47(0.38) | 0.50(0.40) | — |
| $B_2O_3$ (B) | — | — | — | — |

Notes: Concerning values of glass compositions, parenthesized values show cationic % (cationic % of atoms or atom groups (element groups; R, M) parenthesized next to components), and the others show wt %.

TABLE 12

|  | Comparative Example | | | |
| --- | --- | --- | --- | --- |
|  | 2 | 3 | 4 | 5 |
| Glass composition (wt %. cationic %) | | | | |
| $La_2O_3$ (La) | — | — | — | — |
| $Y_2O_3$ (Y) | — | — | — | — |
| $Gd_2O_3$ (Gd) | — | — | — | — |
| $Bi_2O_3$ (Bi) | — | — | — | — |
| $In_2O_3$ (In) | — | — | — | — |
| $Sc_2O_3$ (Sc) | — | — | — | — |
| $Ga_2O_3$ (Ga) | — | — | — | — |
| $GeO_2$ (Ge) | — | — | — | — |
| $SiO_2$ (Si) | — | — | — | — |
| $TiO_2$ (Ti) | — | — | — | — |
| $ZrO_2$ (Zr) | — | — | — | — |
| $Nb_2O_5$ (Nb) | — | — | — | — |
| $Ta_2O_5$ (Ta) | — | — | — | — |
| $WO_3$ (W) | — | — | — | — |
| $SnO_2$ (Sn) | — | — | — | — |
| $Sb_2O_3$ (Sb) | — | — | — | — |
| $CeO_2$ (Ce) | — | — | — | — |
| Total | 100.0 (100.0) | 100.0 (100.0) | 100.0 (100.0) | 100.0 (100.0) |

TABLE 12-continued

|  |  | Comparative Example | | | |
|---|---|---|---|---|---|
|  |  | 2 | 3 | 4 | 5 |
| Glass composition | F | — | — | — | — |
| (Anionic %) | O | (100.0) | (100.0) | (100.0) | (100.0) |
| Climate resistance (time) |  | 189 | 205 | 1,035 | 960 |

Notes: Concerning values of glass compositions, parenthesized values show ionic % (cationic % of atoms or atom groups (element groups; R, M) parenthesized next to components), and the others show wt %.

TABLE 13

|  |  | Average linear expansion coefficient ($\times 10^{-7}$/° C.) | Alkali resistance (mg/cm$^2 \cdot$ hr) |
|---|---|---|---|
| Example | 1 | 91 | 0.9 |
|  | 2 | 93 | 0.1 |
|  | 3 | 88 | 0.7 |
|  | 4 | 84 | 1.2 |
|  | 5 | 95 | 0.6 |
|  | 6 | 96 | 0.9 |
|  | 7 | 85 | 0.4 |
|  | 8 | 88 | 0.5 |
|  | 9 | 79 | 1.3 |
|  | 10 | 85 | 0.9 |
|  | 11 | 86 | 0.2 |
|  | 12 | 89 | 0.8 |
|  | 13 | 85 | 0.2 |
|  | 14 | 84 | 0.6 |
|  | 15 | 96 | 0.5 |
|  | 16 | 95 | 1.1 |
|  | 17 | 90 | 1.0 |
|  | 18 | 92 | 0.9 |
|  | 19 | 96 | 1.2 |
| Comparative | 3 | 88 | 0.7 |
| Example | 4 | 110 | 2.5 |
|  | 5 | 131 | 4.7 |

In each of the glasses obtained in Examples 1 to 19, the time period before the glass surfaces were altered was more than 900 hours, and it is therefore seen that these glasses show remarkably excellent climate resistance. These data show that the glasses obtained in Examples 1 to 15 can maintain stable performances as a luminous efficacy correction filter for an image sensing device of a general VTR camera and others for a long period of time.

On the other hand, the glasses in Comparative Examples 1 and 2 were conventional phosphate glasses, contained at least 60% by weight of phosphorus oxide ($P_2O_5$) and contained a relatively large amount of aluminum oxide ($Al_2O_3$). In these glasses, the time period before their surfaces were altered were only 255 hours and 189 hours, which can be said to be a critical defect for the use thereof with a VTR camera, etc., for a long period of time.

The glass in Comparative Example 3 contained 55.9% of P by cationic %, which amount is larger than the amount range specified in the present invention, and it is therefore poor in climate resistance and showed an alteration on its surfaces in 205 hours.

The glasses in Comparative Examples 4 and 5 had compositions which come under the composition range specified in JP-A-9-100136, while their alkali content differs from that specified in the present invention. The glasses in Examples of the present invention have far smaller thermal expansion coefficients than the glasses in Comparative Examples 4 and 5, and all the glasses in Examples of the present invention have an average linear expansion coefficient of less than $97 \times 10^{-7}$/° C. or less. It is therefore seen that these glasses are free of the problems of cracking, breaking, etc., in processing and polishing the glass. It has been also found that these glasses show a low breaking ratio in the steps of polishing and processing due to their sufficiently low thermal expansion coefficients, and they are therefore excellent over the conventional glasses in yields in production. Further, the glasses in Examples of the present invention are excellent over the conventional glasses in alkali resistance and feasible for ultrasonic cleaning.

What is claimed is:

1. A glass for a near infrared absorption filter, which comprises, by cationic %, 35 to 54% of P, 20 to 47% of Zn, 0 to 8% of R which represents a total of Li, Na, K and Cs which are monovalent metal elements, 0 to 17% of M which represents a total of Mg, Ca, Ba, Sr and Pb which are divalent metal elements, the total of R and M being 1 to 22%, 0.1 to 7% of As, 0.2 to 9% of Cu and 0 to 6% of Al.

2. The glass of claim 1, which comprises, by cationic %, 38 to 52% of P, 22 to 45% of Zn, 0 to 8% of R, 0 to 17% of M, the total of R and M being 2 to 20%, 0.1 to 5% of As, 0.2 to 7% of Cu and 0 to 5% of Al.

3. The glass of claim 1, which comprises, by cationic %, 0 to 8% of Mg, 0 to 9% of Ca, 0 to 5% of Ba, 0 to 5% of Sr, 0 to 6% of Pb, 0 to 8% of Li, 0 to 4% of Na, 0 to 3% of K and 0 to 2% of Cs.

4. The glass of claim 1, which further comprises, by anionic %, 60 to 100% of O and 0 to 40% of F.

5. The glass of claim 1, which further comprises, by cationic %, at least one of the group consisting of 0 to 20% of B, 0 to 1.5% of La, 0 to 1.5% of Y, 0 to 4% of Gd, 0 to 2% of Bi, 0 to 9% of In, 0 to 6% of Sc, 0 to 2% of Ga, 0 to 5% of Ge, 0 to 8% of Si, 0 to 3% of Ti, 0 to 5% of Zr, 0 to 3% of Nb, 0 to 4% of Ta, 0 to 4% of W, 0 to 4% of Sn, 0 to 9% of Sb, 0 to 1% of Ce and 0 to 3% of Rb as an arbitrary component.

6. The glass of claim 1, which comprises, by cationic %, 0.3 to 6% of Al.

7. A glass for a near infrared absorption filter, which comprises, by % by weight, 35 to 50% of phosphorus oxide, 25 to 46% of zinc oxide, 0 to less than 1.5% of an oxide I which represents a total of lithium oxide, sodium oxide, potassium oxide and cesium oxide, 0 to 24% of an oxide II which represents a total of magnesium oxide, calcium oxide, barium oxide, strontium oxide and lead oxide, the total of the oxide I and the oxide II being 0.5 to 25%, 0.05 to 5% of arsenic oxide, 0.2 to 5% of copper oxide and 0 to 5% of aluminum oxide, the total amount of the above components being at least 80% based on the total glass components.

8. The glass of claim 7, which comprises, by % by weight, 37 to 48% of phosphorus oxide, 26 to 40% of zinc oxide, 0 to 1.0% of the oxide I, 0 to 20% of the oxide II, the total of the oxide I and the oxide II being 5 to 23%, 0.1 to 2% of arsenic oxide, 0.5 to 2.5% of copper oxide and 0 to 3% of aluminum oxide, the total amount of the above components being at least 80% based on the total glass components.

9. The glass of claim 7, which comprises, by % by weight, 0 to 4% of magnesium oxide, 0 to 6% of calcium oxide, 0 to 9% of barium oxide, 0 to 5% of strontium oxide, 0 to 15% of lead oxide, 0 to less than 1.5% of lithium oxide, 0 to less than 1.5% of sodium oxide, 0 to less than 1.5% of potassium oxide and 0 to less than 1.5% of cesium oxide, the total amount of the lithium oxide, the sodium oxide, the potassium oxide and the cesium oxide being 0 to less than 1.5%.

10. The glass of claim 7, which further comprises, by % by weight, 0.4 to 3% of aluminum oxide.

11. The glass of claim 7, which has an arsenic oxide/copper oxide weight ratio of at least 0.15.

12. The glass of claim 1, which has an average linear expansion coefficient (100 to 300° C.) of $97 \times 10^{-7}$/° C. or less.

13. The glass of claim 7, which has an average linear expansion coefficient (100 to 300° C.) of $97 \times 10^{-7}$/° C. or less.

14. The glass of claim 1, which has a transmittance of at least 80.0% to light having a wavelength of 400 nm at a thickness of the glass at which the glass shows a transmittance of 10.0% to light having a wavelength of 700 nm.

15. The glass of claim 7, which has a transmittance of at least 80.0% to light having a wavelength of 400 nm at a thickness of the glass at which the glass shows a transmittance of 10.0% to light having a wavelength of 700 nm.

16. A near infrared absorption filter formed of the glass of claim 1 or 7.

17. A solid-state image sensing device to which the near infrared absorption filter of claim 16 is applied.

18. The solid-state image sensing device of claim 17 which uses a photoelectric conversion element.

19. A glass for a near infrared absorption filter, which comprises, by cationic %, 35 to 54% of P, 20 to 47% of Zn, 0 to 8% of R which represents a total of Li, Na, K and Cs which are monovalent metal elements, 0 to 17% of M which represents a total of Mg, Ca, Ba, Sr and Pb which are divalent metal elements, the total of R and M being 1 to 22%, 0.1 to 7% of As, 0.2 to 9% of Cu and 0 to 6% of Al wherein said glass has an average linear expansion coefficient (100 to 300° C.) of $97 \times 10^{-7}$/° C. or less, and a transmittance of at least 80.0% to light having a wavelength of 400 nm at a thickness of the glass at which the glass shows a transmittance of 10.0% to light having a wavelength of 700 nm.

20. A glass for a near infrared absorption filter, which comprises, by % by weight, 35 to 50% of phosphorus oxide, 25 to 46% of zinc oxide, 0 to less than 1.5% of an oxide I which represents a total of lithium oxide, sodium oxide, potassium oxide and cesium oxide, 0 to 24% of an oxide II which represents a total of magnesium oxide, calcium oxide, barium oxide, strontium oxide and lead oxide, the total of the oxide I and the oxide II being 0.5 to 25%, 0.05 to 5% of arsenic oxide, 0.2 to 5% of copper oxide and 0 to 5% of aluminum oxide, the total amount of the above components being at least 80% based on the total glass components wherein said glass has an average linear expansion coefficient (100 to 300° C.) of $97 \times 10^{-7}$/° C. or less, and a transmittance of at least 80.0% to light having a wavelength of 400 nm at a thickness of the glass at which the glass shows a transmittance of 10.0% to light having a wavelength of 700 nm.

* * * * *